(12) United States Patent
Bhatia et al.

(10) Patent No.: US 12,380,051 B1
(45) Date of Patent: Aug. 5, 2025

(54) DYNAMIC PLATFORM SELECTION AND SENSOR MANAGEMENT

(71) Applicant: American Megatrends International, LLC, Duluth, GA (US)

(72) Inventors: Anurag Bhatia, Sugar Hill, GA (US); Winston Thangapandian, Suwanee, GA (US); Pravinash Jeyapaul, Johns Creek, GA (US); Venkatesan Balakrishnan, Chennai (IN); Chitrak Gupta, Kolkata (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 15 days.

(21) Appl. No.: 18/621,450

(22) Filed: Mar. 29, 2024

(51) Int. Cl.
*G06F 13/40* (2006.01)
*G06F 13/42* (2006.01)

(52) U.S. Cl.
CPC ...... *G06F 13/4081* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 5,713,009 A * | 1/1998 | DeRosa, Jr. | G06F 15/177 713/1 |
| 2016/0342617 A1* | 11/2016 | Ramirez | G06F 16/1744 |
| 2017/0177380 A1* | 6/2017 | Yang | G06F 9/4416 |

* cited by examiner

*Primary Examiner* — Tim T Vo
*Assistant Examiner* — Dayton Lewis-Taylor
(74) *Attorney, Agent, or Firm* — TROUTMAN PEPPER LOCKE LLP; Tim Tingkang Xia, Esq.

(57) ABSTRACT

In an aspect of the disclosure, a method, a computer-readable medium, and an apparatus are provided. The apparatus may be a BMC. The BMC detects a platform type of a modular hardware system. The BMC searches for platform-specific files in a storage of the BMC based on the detected platform type. The BMC determines whether the platform-specific files are present in the storage of the BMC. When the platform-specific files are present in the storage of the BMC, the BMC reads the platform-specific files from the storage of the BMC, and the BMC initializes a service using the platform-specific files read from the storage of the BMC.

20 Claims, 5 Drawing Sheets

DYNAMIC PLATFORM SELECTION AND SENSOR MANAGEMENT

BACKGROUND

Field

The present disclosure relates generally to computer systems, and more particularly, to techniques of dynamically detecting platform type and enabling appropriate sensor monitoring by a baseboard management controller (BMC) in a modular hardware system.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture. The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a BMC. The BMC detects a platform type of a modular hardware system. The BMC searches for platform-specific files in a storage of the BMC based on the detected platform type. The BMC determines whether the platform-specific files are present in the storage of the BMC. When the platform-specific files are present in the storage of the BMC, the BMC reads the platform-specific files from the storage of the BMC, and the BMC initializes a service using the platform-specific files read from the storage of the BMC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
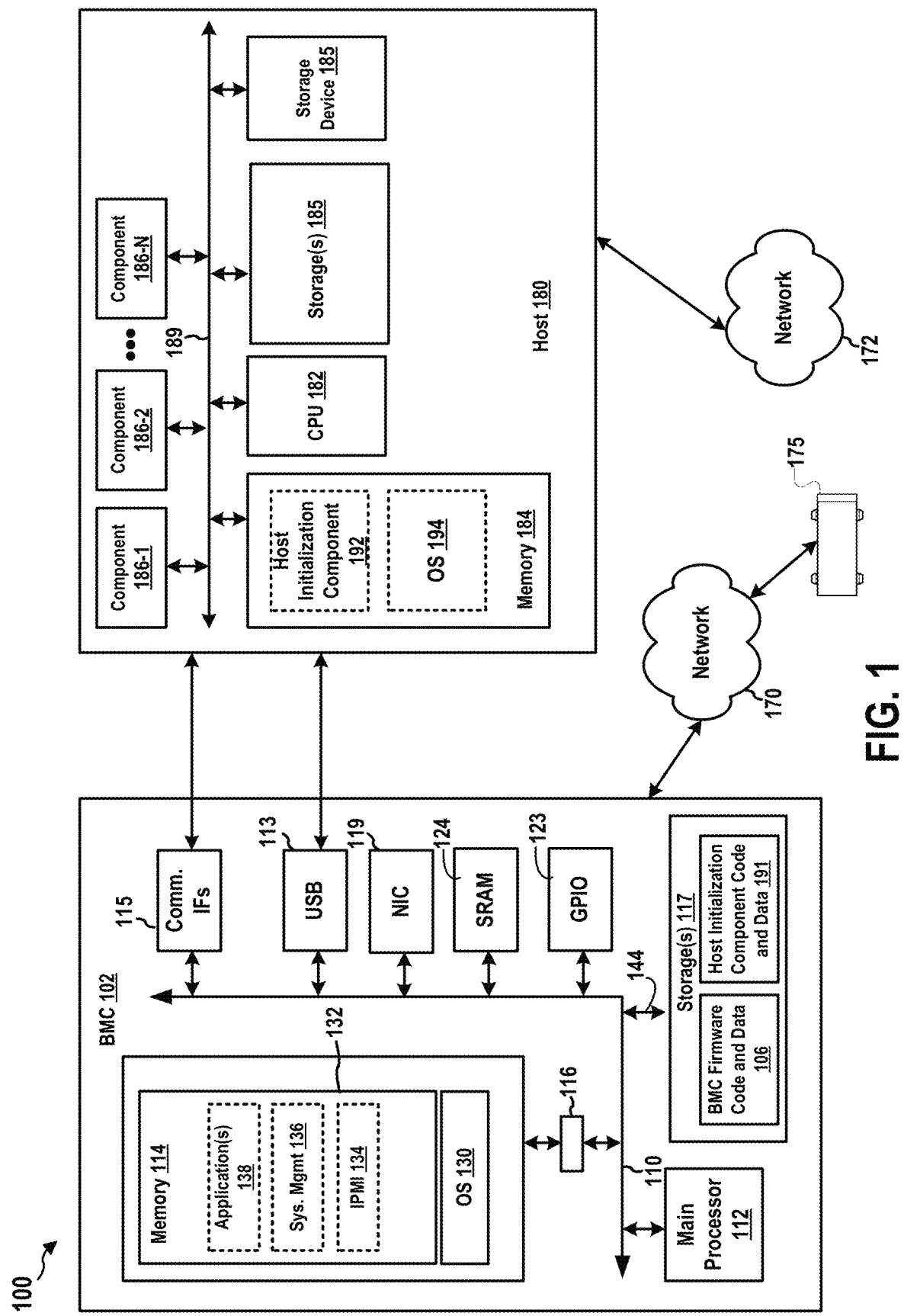
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170. Further, the storage(s) 117 is in communication with the communication channel 110 through a communication link 144.

The server market is currently witnessing a significant transformation due to most Original Equipment Manufacturers (OEMs) and Cloud Service Providers (CSPs) moving towards a modular hardware architecture in their server platforms. Open Compute Project (OCP) details the modularization criteria through its server hardware specifications. The idea behind this approach is to create a hardware ecosystem that is flexible, scalable, and easily upgradable, aligning with the rapid pace of technology advancements in server components.

The Data Center Ready-Modular Hardware System (DC-MHS) specification outlines the essential components of a modular platform. Key to this architecture is the facility it provides for CSPs and OEMs to upgrade existing systems without the need to invest in entirely new server platforms. The components within the servers, such as processors, storage devices, and management controllers, are designed to be replaceable or upgradable as individual units. This approach significantly reduces the Total Cost of Ownership (TCO) for the organizations, as components can be updated or replaced as needed, without a full system overhaul.

One of the primary benefits of adopting the DC-MHS guidelines is the agility it lends to system upgrades. Instead of the lengthy process traditionally involved in replacing or upgrading whole servers, modular components can be slotted in with minimal disruption, greatly accelerating the upgrade lifecycle and ensuring that server platforms can keep pace with evolving workloads and technological advancements.

A DC-MHS includes a Data Center Security and Control Module (DC-SCM). It incorporates essential subsystems such as the Baseboard Management Controller (BMC) stack and the Hardware Root of Trust (ROT).

The DC-SCM is a compact module designed as a daughter card to be integrated onto a server motherboard. The DC-SCM encapsulates several critical management functionalities that are central to the operation and integrity of the server system. The DC-SCM's infrastructure allows it to be easily swapped out or upgraded without the necessitation of replacing the entire server.

The DC-SCM includes a BMC stack. The BMC stack is responsible for the monitorization of the server's hardware state, facilitating remote management capabilities such as power control, system restoration, and logging. The BMC supports the server's lifecycle by providing diagnostic tools, the ability to update firmware, and manage hardware settings even when the server OS is not running. The modularity of BMC within the DC-SCM means that, as server management needs evolve or as new BMC technology gets introduced, the BMC functionality can be updated or replaced independent of other hardware components.

The DC-SCM includes a Hardware Root of Trust (ROT). The ROT is essentially a trusted source of verification for software and firmware loads on the server, establishing a baseline of trust for all operations. It ensures that only signed, verified code is executed on startup to prevent unauthorized firmware from compromising server integrity.

The ROT mechanism functions as the root for all trust chains on the server, and integrating it within the DC-SCM enables a secure boot process.

The DC-MHS further includes a Host Processor Module (HPM). The HPM functions as the 'brain' of the system, hosting processors such as CPUs (Central Processing Units), GPUs (Graphics Processing Units), IPUs (Infrastructure Processing Units), DPUs (Data Processing Units), and accompanying DIMMs (Dual Inline Memory Modules) to provide computing and processing capabilities necessary for running applications and managing workloads.

With the modular approach of DC-MHS, the HPM, including its various processor types and memory, becomes a replaceable unit within the server architecture. Such modularity permits on-the-fly upgrades of the HPM to adapt to new technologies, workloads, or performance goals without the need for comprehensive system replacement. From swapping an outdated CPU to a more powerful one or adding high-capacity DIMMs, the HPM acts as an interchangeable module, facilitating seamless transitions and continuous performance optimization.

The DC-MHS also includes Modular I/O (DC-MIO). The DC-MIO deals with the varied input/output requirements of modern data centers, encapsulating subsystems for storage, network interface cards (NICs), accelerators, and a range of interconnect technologies. These modular components are utilized for a server's connectivity and throughput capabilities to specific workload demands.

The DC-MHS also utilizes SMART Network Interface Cards (NICs) and Data Plane technologies. SMART-NICs are advanced network cards with built-in processors—often based on Field-Programmable Gate Array (FPGA) technology or specific multicore CPUs—that can offload processing tasks from the server's central processing units (CPUs). These network interface cards enable sophisticated processing at the network edge, closer to where data is entering or leaving the server. This form of processing enables efficient data plane operations-those tasks concerned with the forwarding of data packets through the network.

The modular architecture of the DC-MHS improves server upgradeability and system management.

The DC-MHS utilizes modular hardware, enabling easy replacement of components and facilitating easy upgrades. Individual components of the DC-MHS, such as the Host Processor Module (HPM), the DC-SCM, and the Modular I/O, can be interchanged without the requirement of overhauling the entire server infrastructure.

Changes in the HPM can result in the creation of entirely new systems. An HPM upgrade, such as the replacement of a CPU with a more advanced variant, transforms the system's capabilities, aligning it with current performance requisites or specific computational needs.

The modular architecture enables a pay-as-you-go model. This model allows for incremental investments, where CSPs and OEMs can strategically upgrade hardware components based on evolving performance requirements or budget considerations, as opposed to incurring the cost of complete server replacements.

Changes to platform devices necessitate dynamic firmware capabilities, to ensure that upgrades or alterations in hardware are adequately supported by the system's software. An adaptable firmware framework can respond to changes in the HPM or other components, thus maintaining the integrity and functionality of the server's operations. The adaptable firmware framework serves this purpose by dynamically constructing firmware images tailored to the new configuration.

With the advent of a modular design, device and sensor configurations are no longer static but become dynamic entities within the server ecosystem. As components are added, removed, or upgraded, sensor configurations adapt accordingly, ensuring the ongoing accurate monitoring and management of server health and performance parameters.

Further, the DC-SCM enables changes to be made in the management module. Accordingly, the BMC firmware are readily adaptable to support fresh deployments or upgrades.

Figure 2:
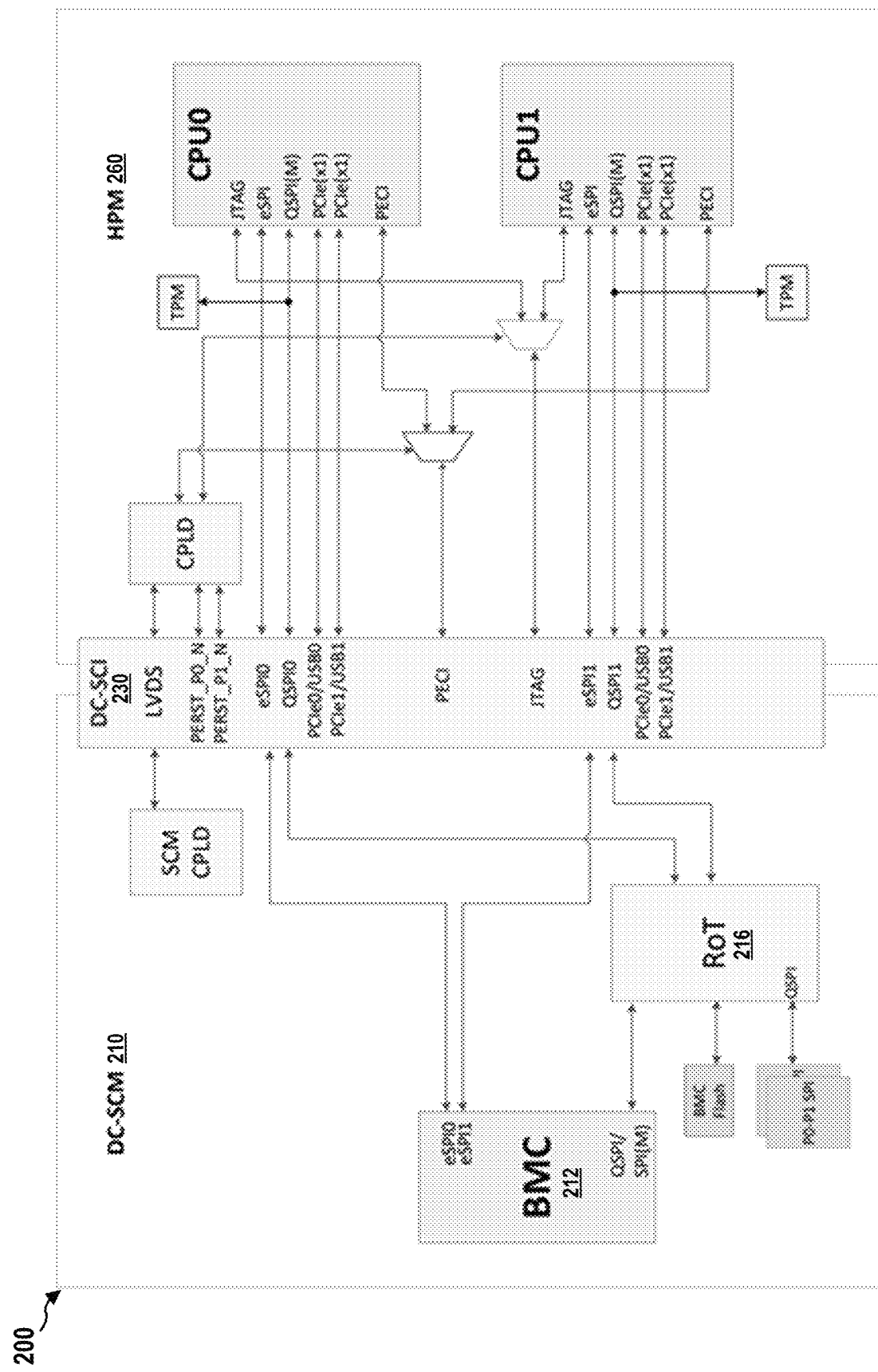
FIG. 2 is a diagram illustrating a modular hardware system.

FIG. 2 is a diagram illustrating a modular hardware system 200. The modular hardware system 200 includes a DC-SCM 210, a HPM 260. The DC-SCM 210 includes a BMC 212 and ROT 216, and a Data Center System Connection Interface (DC-SCI) 230. The HPM 260 includes a CPU0 and a CPU1. The DC-SCM 210 and the HPM 260 are connected via the DC-SCI 230. The DC-SCI 230 serves as the foundational communication backbone connecting the Data Center Security and Control Module (DC-SCM) 210 with the Host Processor Module (HPM) 260. It is equipped with a variety of interfaces and protocols designed to ensure a seamless and efficient data flow between the various server modules.

In the modular hardware system 200, the BMC 212 is part of the DC-SCM 210 and adheres to the specifications of the DC-SCM 210. As a replaceable unit within the DC-SCM 210, the BMC 212 may be transitioned between different BMC System-on-Chip (SOC) components provided by the OEMs and CSPs. Deployable firmware images may be supplied for these BMC modules. That is, the firmware are as interchangeable as the hardware components it manages. For example, the OpenBMC firmware is often used.

The Host Processor Module (HPM) may change in a DC-MHS system. In the example of FIG. 2, the HPM 260 functions as the computing module or "brain" of the modular hardware system 200, hosting processors such as CPUs and GPUs along with memory. If the HPM 260 is upgraded or swapped out, it essentially changes the platform, as a new compute module is introduced. For example, the CPU0 and CPU1 in the existing HPM 260 could be replaced with a newer generation processor. The DC-SCI 230 provides standardized connectivity between the HPM and other modules such as the DC-SCM 210, abstracting low-level interface details. However, the BMC 212 in the DC-SCM 210 still needs awareness of the physical interfaces provided by a new HPM for proper management and monitoring. The BMC 212, residing in the DC-SCM 210, recognizes these changes and interacts appropriately with the new physical interfaces provided by the altered HPM.

The BMC 212 encapsulated in the DC-SCM 210 may also change. As a replaceable daughter card unit, an outdated BMC 212 SOC component may be upgraded to a newer generation BMC SOC with different firmware requirements. Customers utilizing AMI's BMC firmware stack require the flexibility to Tailored BMC firmware images may be built and deployed for any SOC and platform combination that may arise from BMC swaps. That is, the necessary BMC firmware may be generated on-the-fly to accommodate both the SOC and platform configurations. The BMC image should also inherit necessary configurations from the previous BMC while seamlessly supporting the new module.

Device configurations in the modular hardware system 200 are expected to change over time due to hardware lifecycle management involving addition, removal, or upgrades of devices. The BMC firmware has capabilities to dynamically handle such changes in devices and sensors, discovering new devices added and managing them appropriately. The BMC 212 can handle device changes occurring.

The DC-SCI 230, as the primary conduit for communication and interaction among the modular components of the DC-MHS, adheres to a set standard specification. This standardization ensures that, despite the mutable nature of the aforementioned elements (HPM, BMC, and device configurations), the foundational interconnectivity remains consistent and reliable. The DC-SCI 230's role is to provide a stable and secure platform upon which these interchangeable components can operate cohesively.

In the modular hardware system 200 shown in FIG. 2, the DC-SCM 210 and HPM 260 are separate replaceable modules connected via the DC-SCI 230 interface. As discussed, the HPM 260 as the compute module can be swapped out or upgraded, essentially changing the platform. Similarly, the BMC 212 within the DC-SCM 210 is a replaceable daughter card unit that can also be changed to a newer generation BMC SOC.

To handle such mutable components and platforms, the BMC firmware also has portability. The firmware is configurable to support any alterations occurring in modules of the modular hardware system 200 such as the HPM 260 or BMC 212. For example, if the HPM 260 is swapped from one processor to another, the firmware of the BMC 212 can dynamically handle the new physical interfaces and devices presented by the changed HPM module.

Further, if the BMC 212 itself is upgraded to a newer SOC generation with different firmware requirements, the modular approach allows tailored BMC firmware images to be constructed on-the-fly based on both the new SOC and platform combination. A build orchestration system maintains repositories of SOC drivers, bootloaders, porting components etc. that can be pulled in dynamically to generate firmware images compatible with the new configurations. This firmware portability allows the BMC 212 to adapt to changes in the modular hardware system 200.

The BMC firmware architecture is a framework that includes Intellectual Properties (IP) and abstraction layers that cater to various silicon (i.e., processors) providers (e.g., Intel, AMD, NVIDIA, Qualcomm, and ARM). This multi-tiered architecture comprises the following features:

Silicon Provider IP: This represents the proprietary technology or IP provided by the silicon manufacturers. For example, it includes specific drivers or firmware necessary to interact with CPUs such as CPU0 and CPU1 of the HPM 260.

CSP IP: Cloud Service Provider (CSP) specific IPs that are tailored to the requirements of service providers managing cloud infrastructure.

BMC Vendor IP: BMC Vendor contributes its proprietary IP as part of the firmware stack, ensuring integration with its suite of deployment and management tools.

Application Abstraction (SDK): An SDK (Software Development Kit) layer abstracts the underlying complexity and provides a standardized set of tools for application development.

Platform Abstraction (PDK): The Platform Development Kit (PDK) encapsulates platform-specific information and abstracts the complexities of hardware interaction. It aids in the discovery, management, and monitoring of devices and sensors connected to the modular server system.

SOC Abstraction (HAL): A Hardware Abstraction Layer (HAL) that provides SOC-specific interfaces, thus creating a separation between the hardware specifics and the firmware logic.

OpenBMC: A base framework for BMC firmware development.

These components of the BMC firmware architecture enable the firmware to dynamically handle each unique platform configuration, such as when the BMC 212 interfaces the HPM 260 whose components have been changed.

The SOC Abstractions may be provided within the Yocto build framework. The Yocto build framework is an open source tool for building custom Linux-based systems for embedded and IoT devices. The SOC abstraction layers provided by Yocto enables portability across different BMC SOCs. As part of the firmware architecture, abstractions for the BMC System-on-Chip (SOC) are provided in case the DC-SCM module containing the BMC is changed. The Yocto build framework provides these abstractions through modular metadata layers specific to each SOC.

These meta-<soc> layers contain the recipes, packages, configuration files etc. required to build the BMC firmware image for that particular SOC. For example, the meta-aspeed layer has everything needed to compile the firmware for an Aspeed AST2500 or AST2600 SOC. This includes the Linux kernel, bootloaders, drivers, libs, apps, configs etc. Similarly, there can be a meta-nuvoton layer for Nuvoton NPCM7xx SOCs.

If the hardware changes from Aspeed SOC to Nuvoton, a Build Orchestrator tool will include the meta-nuvoton layer instead of meta-aspeed during image generation. As such, the abstraction layers enable porting the firmware across different BMC SOC hardware with minimal changes to the rest of the firmware stack. When BMC hardware upgrade happens by replacing the BMC 212 with a newer generation BMC System-on-Chip (SOC), a tailored BMC firmware image are loaded promptly on the new module to minimize server downtime.

To enable rapid roll-out of firmware, the Build Orchestrator system maintains repositories of pre-built components such as kernel, bootloaders, configuration files etc. for various BMC SOCs. Specifically, the Yocto meta-layers contain modular recipes to build BMC firmware for a particular SOC. When the BMC 212 SOC is changed, the Build Orchestrator identifies the target hardware and injects the appropriate meta-layer into the build process to generate firmware with relevant kernel, drivers, libs suited to the new BMC chip. Additionally, Platform Configuration Capsules store modular device configurations needed for discovery and sensor management on that specific server platform. By bringing together these hardware-specific modules at build time, the orchestration system can synthesize a customized, production-grade BMC image for deployment on the new DC-SCM BMC card. Thus, the configurable modular architecture enables rapid roll-out of tailored firmware to support hardware upgrades in line with the dynamic nature of modular platforms.

In the modular hardware system 200, the platform configuration for the BMC 212 can be abstracted through modular platform-specific files handled dynamically at runtime. When the system changes due to HPM 260 alterations or other device modifications, corresponding platform-specific files are provided to the BMC 212 firmware to handle the new configuration.

These platform-specific files enabling device discovery, sensor monitoring, event actions etc. are packaged into modules called platform configuration capsules (PCCs). The PCCs may contain one or more of the following:

Sensor Data Record (SDR) information: Detailing the mappings of sensors to their respective I2C buses within the modular server system, aiding in prescient sensor management.

Platform event filter configurations: Seizing event messages tailored to specific chips—akin to Intel or any emerging variant—and configuring responsive actions pertinent to such events.

Vendor platform-specific libraries and configurations, including Entity manager JSON files: Governing the establishment of settings and standards aligned with the AMI intellectual property's requirements.

Platform-specific static tables, Management Controller Transport Protocol (MCTP) endpoint tables, Platform Level Data Model (PLDM) Platform Descriptor Records (PDRs): Furnishing static references which are instrumental for the identification and communication with different platform components.

Power and thermal configurations and algorithms: Regulating the server's thermal profile and energy consumption, pivotal for maintaining operational efficiency and integrity within the DC-MHS.

For example, an "archercity" platform will have an archercity.pcc capsule. The PCC files packages are bound to the server platform with unique identifiers. The PCC files packages are accessible for download and integration at runtime from EMMC storage or a deployment cloud, For example, when the HPM 260 changes prompting an image rebuild, the appropriate PCC capsule for the new platform is downloaded by the BMC 212 providing the URL. The BMC 212 notifies the build orchestrator of HPM or device changes, passing the CPU info to build a tailored image.

Thus, platform-specifics are abstracted into modular PCCs handled dynamically allowing portable BMC 212 firmware across hardware changes like HPM swaps. The interconnect DC-SCI 230 remains standard between DC-SCM 210 and mutable modules like HPM 260. This firmware portability supports the flexible hardware upgrades in line with the dynamic modular architecture.

Figure 3:
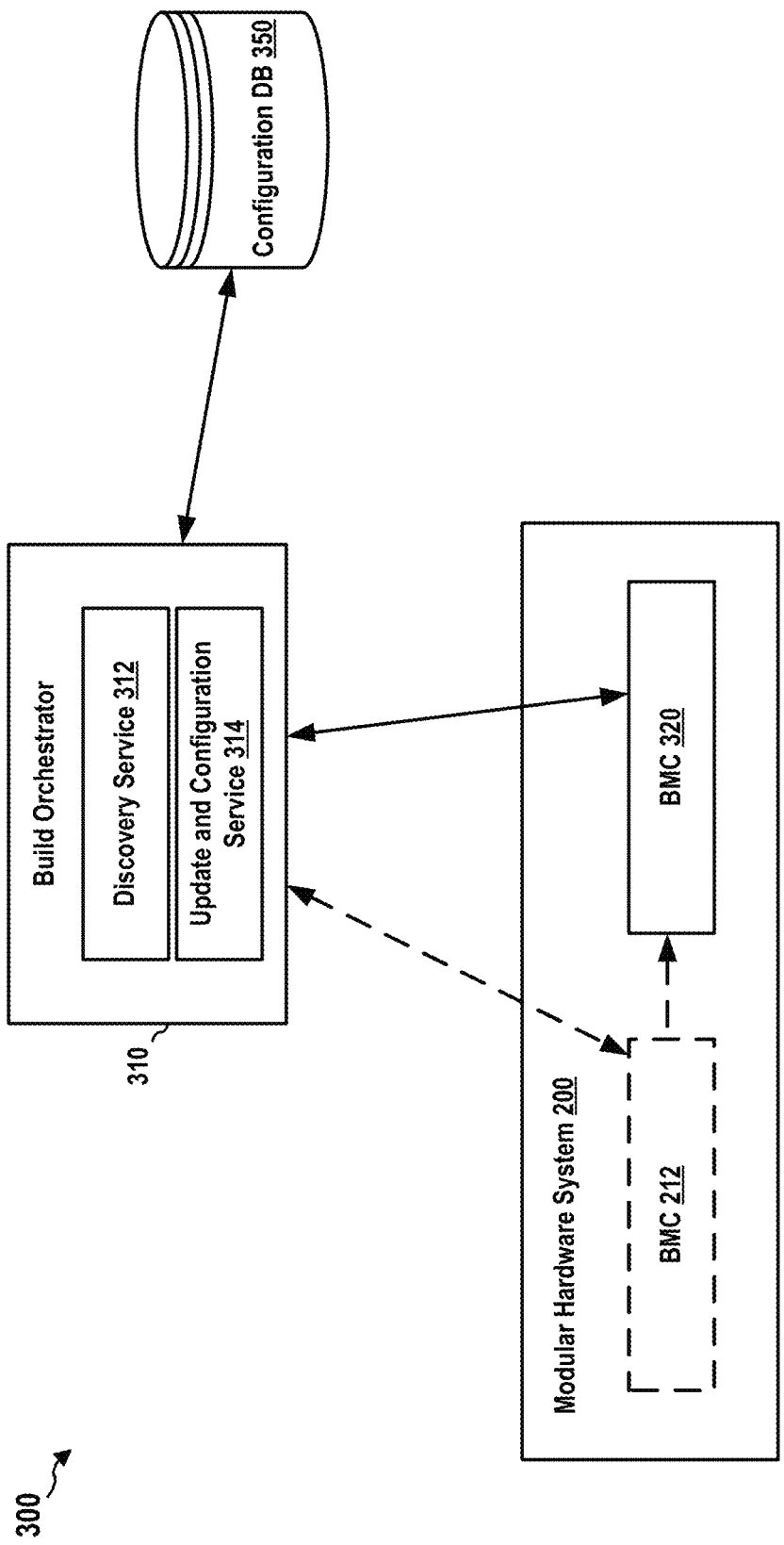
FIG. 3 is a diagram illustrating a build orchestrator.

FIG. 3 is a diagram 300 illustrating a build orchestrator 310. The build orchestrator 310 includes a discovery service 312 and an update and configuration service 314, and is in communication with a configuration database 350.

The build orchestrator 310 automates the process of constructing firmware images that are tailored to the specific configurations of the the modular hardware system 200's hardware. The build orchestrator 310 may continuously monitor the modular hardware system 200 for any events that signal changes in the hardware configuration. These changes may involve the HPM 260, which includes CPU0 and CPU1, or the BMC 212 embedded within the DC-SCM 210. When such an event is detected, the build orchestrator 310 is responsible for initiating a build process that assembles a new firmware image compatible with the updated hardware setup.

An orchestration process executed by the build orchestrator 310 involves managing a repository of firmware components, which includes drivers, bootloaders, and platform-specific configurations. The build orchestrator 310 uses this repository to put together a firmware image that aligns with the new configuration of the system's hardware.

The build orchestrator 310 may leverage a Yocto-based build framework to compile the necessary components and generate the firmware image. This includes selecting the appropriate Yocto meta-layers that correspond to the System-on-Chip (SOC) used in the BMC 212 or other hardware components that have undergone changes. Once the firmware image is constructed, the build orchestrator 310 oversees its deployment to the BMC 212, which may require the BMC to enter flash mode for the firmware update and subsequently reboot the system to apply the new configuration.

Additionally, the build orchestrator 310 provides an Application Programming Interface (API) that enables the BMC 212 to communicate hardware changes and request the generation of new firmware images. This API facilitates automated interactions between the BMC 212 and the build orchestrator 310, allowing for real-time updates and modifications to the firmware in response to changes within the hardware system.

The build orchestrator 310 maintains the firmware's integrity and compatibility within the modular hardware system 200. The updated firmware remains synchronized with the hardware configuration, whether it pertains to the processors within the HPM 260, the management components within the DC-SCM 210, or the protocols managed by the DC-SCI 230.

Figure 4:
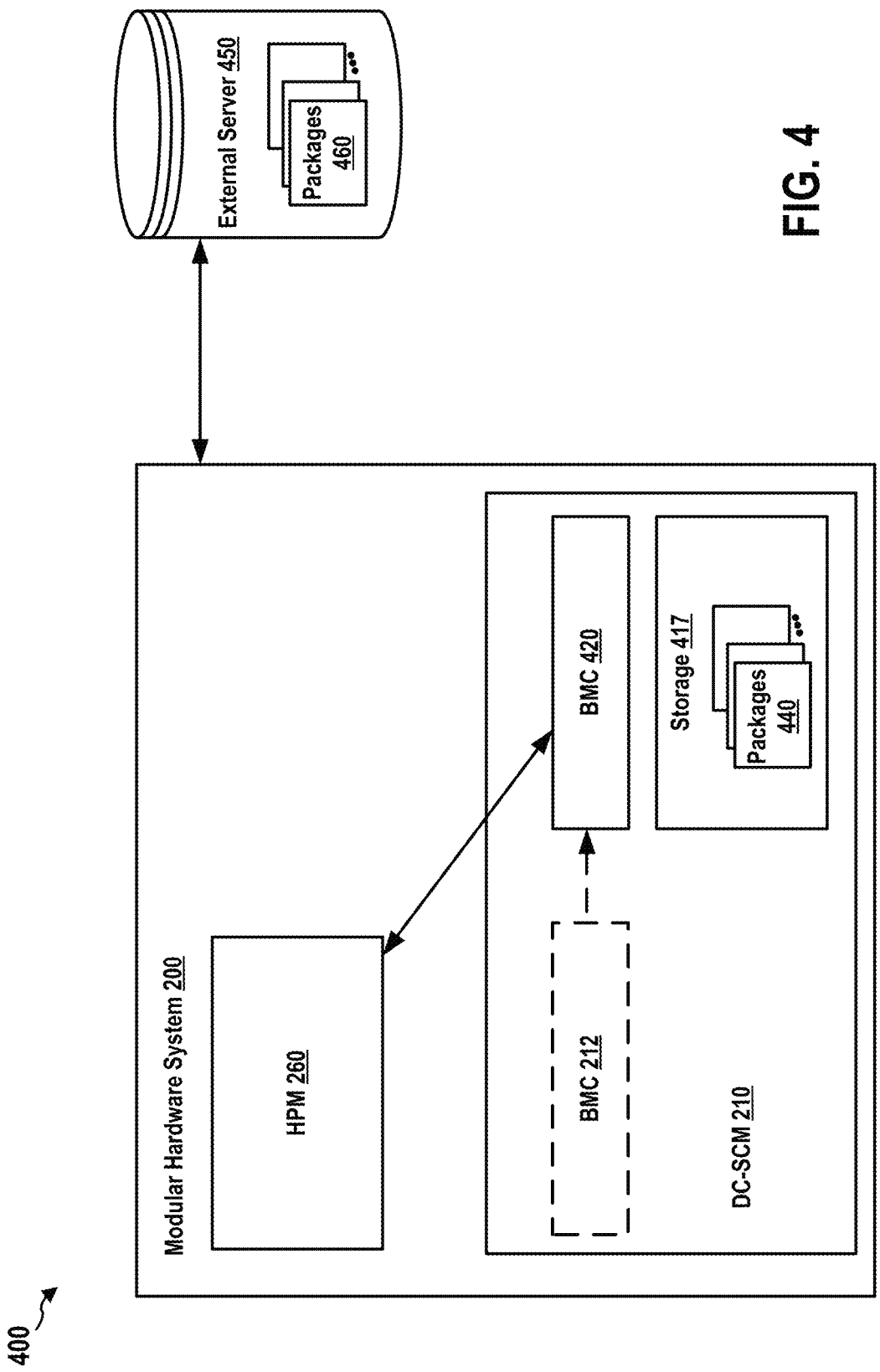
FIG. 4 is a diagram illustrating replacing a BMC in a modular hardware system.

FIG. 4 is a diagram 400 illustrating replacing a BMC in the modular hardware system 200. In this example, the BMC 212 is part of the DC-SCM 210 and is being replaced by a BMC 420. Further, the DC-SCM 210 includes a storage 417, which may be a secondary storage and may be an eMMC storage. As shown in FIG. 2, the modular hardware system 200 includes the HPM 260, which contains a chipset. Further, the modular hardware system 200 is in communication with an external server 450.

The server market is currently undergoing a significant shift towards modular hardware architectures, as exemplified by the Open Compute Project's (OCP) Data Center Ready-Modular Hardware System (DC-MHS) specification. This modular approach offers numerous advantages, including enhanced flexibility, scalability, and simplified upgradeability. One of the key components of the DC-MHS is the Data Center Security and Control Module (DC-SCM), which houses critical management functionalities such as the Baseboard Management Controller (BMC) stack and the Hardware Root of Trust (ROT). The BMC stack plays a crucial role in monitoring the server's hardware state and enabling remote management capabilities. However, traditional BMC firmware is often statically built for specific platforms, creating challenges in modular environments where components can be swapped or upgraded.

For example, there may be different platforms running on different processors (or silicon). The code of the BMC stack may support all the processors and platforms. But the features, configurations, and other settings must be selected at compile time. Once the image is generated, it will mostly be used for that particular platform. This approach presents a problem because even though the BMC stack has options for multiple configurations, choosing the platform at runtime is not available today. That is, the features, configurations, and other settings may not be changed at run time.

In general, the modular hardware system 200 provides a flexible and adaptable architecture for server platforms. However, this flexibility introduces challenges in managing the unique sensor configurations and management schemes for each platform. Vendors of BMCs traditionally provides predefined Platform Abstraction and Porting (PAR) and Platform Development Kit (PDK) packages for platform definition and sensor management. These packages include a hard-coded set of files tailored to enable sensor management for each specific platform.

The DCSCM board in the modular hardware system 200 can support various BMCs and versions. For example, if a platform has a DCSCM board with one BMC, and the user wants to upgrade the platform with a different version of the BMC or use another DCSCM card with a different BMC, the hardware with the DCSCM specification allows for this flexibility. However, to fully leverage this pluggable hardware capability, a firmware solution is needed to support these dynamic configurations.

The proposed solution addresses the challenges of managing unique sensor configurations and management schemes in modular server platforms. It introduces a method to dynamically select the platform type at runtime and enable the appropriate sensor management packages for that platform.

In a first configuration, a set of management packages 440 may be stored on the onboard memory of the DC-SCM 210, such as the storage 417. The management packages 440 may be platform-specific sensor management packages. For example, during its operation, the BMC 212 may store the management packages 440 in the storage 417.

In a second configuration, a set management packages 460 may be stored on a remote server such as the external server 450. Both the first configuration and the second configuration may be beneficial in cases where the BMC 212 adheres to the RunBMC specification of OCP and is a pluggable daughter card on the motherboard, as in the DC-SCM 210.

The management packages 440/460 contain platform-specific files necessary for the BMC 420 to function properly on a given platform. These files may include:
Sensor Data Record (SDR) information
Platform event filter configurations
Company A Platform Development Kit (PDK) and Platform Abstraction and Porting (PAR) libraries and configurations
Platform-specific static tables, Management Component Transport Protocol (MCTP) endpoint tables, and Platform Level Data Model (PLDM) Platform Descriptor Records (PDRs)
Power and thermal configurations and algorithms For OpenBMC-based systems, the packages may also include:
Entity manager definitions
Platform inventory
Platform device files
Sensor mapping documents
Field Replaceable Unit (FRU) inventory configuration The management packages 440/460 may be archived as platform configuration capsules bound with platform identifiers. These management packages 440 can be stored on the DC-SCM 210 itself in a secure storage, such as the storage 417 (which may be an eMMC). The management packages 460 may be available for download from the remote server, such as the external server 450, by using the URL of the capsule. The names of the capsules correspond to the platforms they support, e.g., archercity.pcc or olympus.pcc.

The BMC 420, which replaces the BMC 212 in the DC-SCM 210, has the capability to identify the platform type of the modular hardware system 200. After the BMC 420 is plugged in, the firmware of the BMC 420 identifies the platform type at runtime. The method for identifying the platform can be platform-specific, such as reading a hardware pin or specific registers. More specifically, this identification can be done by reading a GPIO setting or through an IPMI command initiated by the BIOS to the BMC 420.

Once the platform is identified, the firmware checks if it already has support for that platform from the storage 417. If the firmware found the necessary configurations for the identified platform, including sensor, power, event, thermal, or device configurations, from the management packages 440 stored on the storage 417, these configurations are loaded into the BMC 420's memory location. The firmware then loads and applies these configurations during the boot process. As such, the platform-specific settings are applied when the BMC 420 is booted. Accordingly, the sensor monitoring service is initialized. The management packages 440 contain platform-specific files necessary for the BMC 420 to function properly on a given platform, including sensor configurations, event filters, power and thermal configurations, and more.

In cases where the platform is new and the BMC 420 does not have the required configurations, the firmware can fetch the appropriate configuration files from the management packages 460 of the external server 450, by matching the platform type. Further, the build orchestrator 310, with its discovery service 312 and update and configuration service 314, can assist in this process by managing the repository of platform-specific configurations in the configuration database 350. The fetched configuration files are then applied by the BMC 212 during the boot process.

The external server 450 are updated with all supported platforms. The external server 450 maintains signed packages that are tamper-proof. The BMC 420 verifies the signing certificate before enabling the sensor monitoring functionality.

The remote server, such as the external server 450, aids in the continuous deployment of platform-specific packages as new platforms or architectures are developed. This supports RunBMC architectures where daughter cards can move from platform to platform as long as they support the OCP specification. As new platforms emerge, the porting packages are signed and deployed on the centralized server such as the external server 450.

In another embodiment, a single BMC can be used as a provisioning server for platform files, reducing the overhead of maintaining a separate server. In this scenario, a single BMC contains the master list of platform files and can distribute them to multiple BMCs in the data center.

This dynamic platform selection and sensor management solution enables the modular hardware system 200 to adapt to various platforms and configurations, enhancing the flexibility and scalability of the system.

Figure 5:
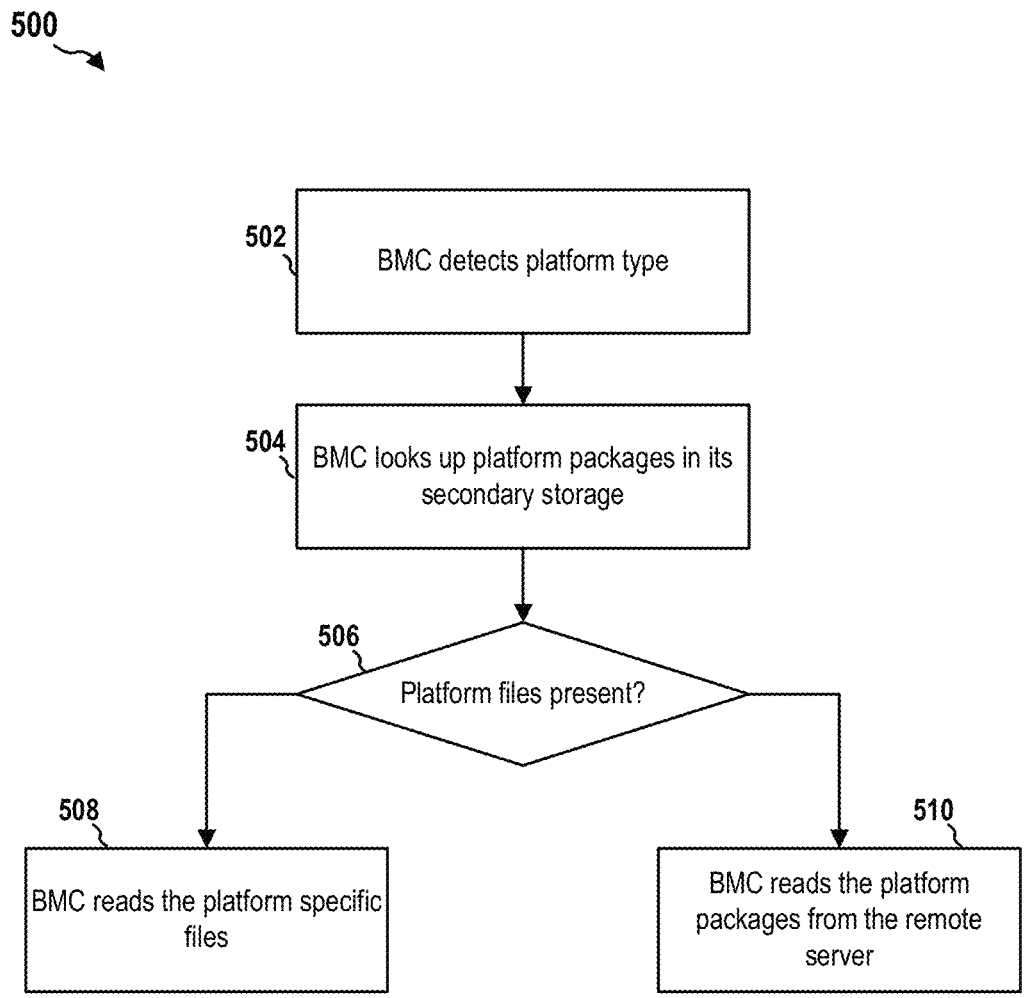
FIG. 5 is a flow chart of a method for dynamic platform selection and sensor management in the modular hardware system.

FIG. 5 is a flow chart 500 of a method for dynamic platform selection and sensor management in the modular hardware system 200. In operation 502, the BMC 420 detects the platform type of the modular hardware system 200. The BMC 420 can read a GPIO setting to understand the platform type or can detect the platform type through an IPMI command initiated by the BIOS to the BMC 420.

In operation 504, once the platform type is detected, the BMC 420 looks up its own secondary storage area, such as the storage 417, for the set of platform definition files in the management packages 440.

In operation 506, the BMC 420 determines if the platform-specific files are present in the storage 417. If the files are present, the process moves to operation 508. If the files are not present, the process moves to operation 510.

In operation 508, if the platform-specific files are present in the storage 417, the BMC 420 reads these files from the management packages 440. The packages are then loaded, and the sensor monitoring service is initialized using the loaded platform-specific configurations.

In operation 510, if the platform-specific files are not present in the secondary memory of the BMC 420, such as the storage 417, the BMC 420 searches for the files in pre-configured centralized servers, such as the external server 450. The BMC 420 reads the platform-specific files from the management packages 460 stored on the external server 450.

The storage areas, including the storage 417 and the external server 450, are updated with all supported platforms. The external server 450 maintains signed packages for are tamper-proof. The BMC 420 verifies the signing certificate before enabling the sensor monitoring functionality using the retrieved platform-specific configurations.

The external server 450 aids in the continuous deployment of the platform-specific packages as new platforms or architectures are developed. This supports RunBMC architectures where daughter cards, such as the DC-SCM 210, can move from platform to platform as long as they support the OCP specification. As new platforms emerge, the porting packages are signed and deployed on the external server 450.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:
   detecting, by the BMC, a platform type of a modular hardware system;
   searching, by the BMC, for platform-specific files in a storage of the BMC based on the detected platform type;
   determining, by the BMC, whether the platform-specific files are present in the storage of the BMC; and
   when the platform-specific files are present in the storage of the BMC:
      reading, by the BMC, the platform-specific files from the storage of the BMC; and
      initializing, by the BMC, a service using the platform-specific files read from the storage of the BMC.

2. The method of claim 1, further comprising:
   when the platform-specific files are not present in the storage of the BMC:
      searching, by the BMC, for the platform-specific files in a pre-configured external server; and
      reading, by the BMC, the platform-specific files from the pre-configured external server.

3. The method of claim 2, further comprising:
   verifying, by the BMC, a signing certificate of the platform-specific files read from the pre-configured external server before initializing the service.

4. The method of claim 1, wherein detecting the platform type comprises reading a general purpose input/output (GPIO) setting or receiving an Intelligent Platform Management Interface (IPMI) command initiated by a Basic Input/Output System (BIOS) of the modular hardware system.

5. The method of claim 1, wherein the platform-specific files are stored as platform configuration capsules bound with platform identifiers.

6. The method of claim 1, wherein the platform-specific files comprise at least one of:
   Sensor Data Record (SDR) information,
   platform event filter configurations,
   Platform Development Kit (PDK) and Platform Abstraction and Porting (PAR) libraries and configurations,
   platform-specific static tables,
   Management Component Transport Protocol (MCTP) endpoint tables,
   Platform Level Data Model (PLDM) Platform Descriptor Records (PDRs), or
   power and thermal configurations and algorithms.

7. The method of claim 1, wherein the storage of the BMC is an electrically erasable programmable read-only memory (EEPROM) or an embedded MultiMediaCard (eMMC).

8. The method of claim 1, wherein the service initialized by the BMC using the platform-specific files is a sensor monitoring service.

9. The method of claim 1, wherein the BMC is a pluggable daughter card on a motherboard of the modular hardware system.

10. A baseboard management controller (BMC), comprising:
    a processor; and
    a memory storing instructions which when executed by the processor cause the BMC to:
    detect a platform type of a modular hardware system;
    search for platform-specific files in a storage of the BMC based on the detected platform type;
    determine whether the platform-specific files are present in the storage of the BMC; and
    when the platform-specific files are present in the storage of the BMC:
       read the platform-specific files from the storage of the BMC; and
       initialize a service using the platform-specific files read from the storage of the BMC.

11. The BMC of claim 10, wherein the instructions further cause the BMC to:
    when the platform-specific files are not present in the storage of the BMC:
    search for the platform-specific files in a pre-configured external server; and
    read the platform-specific files from the pre-configured external server.

12. The BMC of claim 11, wherein the instructions further cause the BMC to:
    verify a signing certificate of the platform-specific files read from the pre-configured external server before initializing the service.

13. The BMC of claim 10, wherein detecting the platform type comprises reading a general purpose input/output (GPIO) setting or receiving an Intelligent Platform Management Interface (IPMI) command initiated by a Basic Input/Output System (BIOS) of the modular hardware system.

14. The BMC of claim 10, wherein the platform-specific files are stored as platform configuration capsules bound with platform identifiers.

15. The BMC of claim 10, wherein the platform-specific files comprise at least one of:
    Sensor Data Record (SDR) information,
    platform event filter configurations,
    Platform Development Kit (PDK) and Platform Abstraction and Porting (PAR) libraries and configurations,
    platform-specific static tables,
    Management Component Transport Protocol (MCTP) endpoint tables,
    Platform Level Data Model (PLDM) Platform Descriptor Records (PDRs), or
    power and thermal configurations and algorithms.

16. The BMC of claim 10, wherein the storage of the BMC is an electrically erasable programmable read-only memory (EEPROM) or an embedded MultiMediaCard (eMMC).

17. The BMC of claim 10, wherein the service initialized by the BMC using the platform-specific files is a sensor monitoring service.

18. The BMC of claim 10, wherein the BMC is a pluggable daughter card on a motherboard of the modular hardware system.

19. A non-transitory computer-readable medium storing instructions which when executed by a processor of a baseboard management controller (BMC) cause the BMC to:
- detect a platform type of a modular hardware system;
- search for platform-specific files in a storage of the BMC based on the detected platform type;
- determine whether the platform-specific files are present in the storage of the BMC; and
- when the platform-specific files are present in the storage of the BMC:
  - read the platform-specific files from the storage of the BMC; and
  - initialize a service using the platform-specific files read from the storage of the BMC.

20. The non-transitory computer-readable medium of claim 19, wherein the instructions further cause the BMC to:
- when the platform-specific files are not present in the storage of the BMC:
- search for the platform-specific files in a pre-configured external server; and
- read the platform-specific files from the pre-configured external server.

* * * * *